(12) United States Patent
Jang

(10) Patent No.: US 12,487,763 B2
(45) Date of Patent: Dec. 2, 2025

(54) METHOD AND APPARATUS WITH MEMORY MANAGEMENT AND NEURAL NETWORK OPERATION

(71) Applicant: SAMSUNG ELECTRONICS CO., LTD., Suwon-si (KR)

(72) Inventor: Jiseung Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 891 days.

(21) Appl. No.: 17/243,991

(22) Filed: Apr. 29, 2021

(65) Prior Publication Data

US 2022/0206698 A1    Jun. 30, 2022

(30) Foreign Application Priority Data

Dec. 31, 2020  (KR) ........................ 10-2020-0188928

(51) Int. Cl.
*G06F 3/06* (2006.01)
*G06N 3/02* (2006.01)
(Continued)

(52) U.S. Cl.
CPC .......... *G06F 3/0638* (2013.01); *G06F 3/0604* (2013.01); *G06F 3/0679* (2013.01);
(Continued)

(58) Field of Classification Search
CPC combination set(s) only.
See application file for complete search history.

(56) References Cited

U.S. PATENT DOCUMENTS

| 8,489,529 B2 | 7/2013 | Deng et al. |
| 9,418,334 B2 | 8/2016 | Sainath et al. |
| (Continued) | | |

FOREIGN PATENT DOCUMENTS

| JP | 6640243 B2 | 2/2020 |
| KR | 10-2017-0096105 A | 8/2017 |
| (Continued) | | |

OTHER PUBLICATIONS

Bulatov, Yaroslav. "Fitting Larger Networks into Memory." Medium, Nov. 21, 2020. https://medium.com/tensorflow/fitting-larger-networks-into-memory-583e3c758ff9. (Year: 2020).*
(Continued)

*Primary Examiner* — Omar F Fernandez Rivas
*Assistant Examiner* — Corey M Sackalosky
(74) *Attorney, Agent, or Firm* — NSIP Law

(57) ABSTRACT

A processor-implemented memory management method includes: receiving a parameter of a neural network and information of a device configured to perform an operation using the neural network; storing a result of an operation by at least one of layers included in the neural network in a first memory of the device, during a forward propagation operation performed for the neural network based on the parameter; storing a gradient of a layer included in the neural network in a second memory of the device, during a backward propagation operation performed for the neural network based on the parameter and the result of the operation by the at least one layer; and managing the first memory and the second memory based on the information, the result of the operation by the at least one layer, and the gradient.

32 Claims, 5 Drawing Sheets

(51) Int. Cl.
*G06N 3/063* (2023.01)
*G06N 3/08* (2023.01)

(52) U.S. Cl.
CPC ............... *G06N 3/02* (2013.01); *G06N 3/063* (2013.01); *G06N 3/08* (2013.01)

(56) References Cited

U.S. PATENT DOCUMENTS

| | | | |
|---|---|---|---|
| 10,083,395 | B2 | 9/2018 | Young |
| 10,534,997 | B2 | 1/2020 | Tucker et al. |
| 10,540,588 | B2* | 1/2020 | Burger .................. G06N 3/063 |
| 10,698,766 | B2* | 6/2020 | Zhao ...................... G06N 20/00 |
| 10,802,937 | B2* | 10/2020 | Crosby .................. G06N 20/00 |
| 2014/0180989 | A1 | 6/2014 | Krizhevsky et al. |
| 2016/0269313 | A1 | 9/2016 | Brooker et al. |
| 2017/0351530 | A1 | 12/2017 | Gupta et al. |
| 2018/0136912 | A1* | 5/2018 | Venkataramani ...... G06N 3/048 |
| 2019/0114537 | A1 | 4/2019 | Wesolowski et al. |
| 2019/0205745 | A1* | 7/2019 | Sridharan ............. G06F 9/5061 |
| 2019/0287022 | A1* | 9/2019 | Zhang ..................... G06N 20/00 |
| 2020/0004625 | A1* | 1/2020 | Borlick .................. G06N 3/084 |

FOREIGN PATENT DOCUMENTS

| | | |
|---|---|---|
| KR | 10-1934067 B1 | 1/2019 |
| KR | 10-2019-0062778 A | 6/2019 |
| WO | WO-2021084485 A1 * 5/2021 ........... G06K 9/6256 |

OTHER PUBLICATIONS

Chen, Tianqi, et al. "Training deep nets with sublinear memory cost." arXiv preprint arXiv:1604.06174 (2016) (12 pages in English).

Rhu, Minsoo, et al. "vDNN: Virtualized deep neural networks for scalable, memory-efficient neural network design." 2016 49th Annual IEEE/ACM International Symposium on Microarchitecture (Micro). IEEE, 2016 (13 pages in English).

* cited by examiner

METHOD AND APPARATUS WITH MEMORY MANAGEMENT AND NEURAL NETWORK OPERATION

CROSS-REFERENCE TO RELATED APPLICATIONS

This application claims the benefit under 35 USC § 119(a) of Korean Patent Application No. 10-2020-0188928 filed on Dec. 31, 2020, in the Korean Intellectual Property Office, the entire disclosure of which is incorporated herein by reference for all purposes.

BACKGROUND

1. Field

The following description relates to a method and apparatus with memory management and a neural network operation.

2. Description of Related Art

Training a neural network model may include forward propagation, loss calculation, and backward propagation. In the process of training the neural network, a loss may be calculated by comparing a result of prediction through forward propagation to ground truth, and a degree of change for the output of the neural network model to be close to the ground truth may be calculated through backward propagation.

A variety of data may be stored in a memory of a device that performs a neural network operation during learning. For example, the data stored in the memory may include input data input to layers of the neural network model, a weight parameter of the layer of the neural network model, intermediate data in which the results output when an operation is performed by the layer are stored, and a gradient calculated in a backward propagation operation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented memory management method includes: receiving a parameter of a neural network and information of a device configured to perform an operation using the neural network; storing a result of an operation by at least one of layers included in the neural network in a first memory of the device, during a forward propagation operation performed for the neural network based on the parameter; storing a gradient of a layer included in the neural network in a second memory of the device, during a backward propagation operation performed for the neural network based on the parameter and the result of the operation by the at least one layer; and managing the first memory and the second memory based on the information, the result of the operation by the at least one layer, and the gradient.

The first memory may include a local memory, and the second memory may include a global memory.

The information may include a number of cores of the device and a size of the first memory.

The storing in the first memory may include: setting a checkpoint in the at least one layer; and storing the result of the operation by the at least one layer in which the checkpoint is set in the first memory.

The setting of the checkpoint may include setting the checkpoint in layers of the layers, wherein a number of the layers in which the checkpoint is set corresponds to a square root of a number of all layers included in the neural network.

The storing in the second memory may include: determining the gradient of the layer included in the neural network based on the parameter and the result of the operation by the at least one layer; and storing the gradient in the second memory at the same time as the determining.

The managing may include: determining a number of batches processable by a layer included in the neural network based on the parameter, the result of the operation by the at least one layer, and the size of the first memory; and obtaining a maximum number of batches for a parallel operation of the neural network based on the number of batches.

The managing further may include generating a code for performing the parallel operation of the neural network based on the maximum number of batches.

The generating of the code may include generating the code based on an intermediate representation in which a checkpoint set in the at least one layer, the gradient, and the maximum number of batches are each reflected.

The method may include deleting the result of the operation by the at least one layer from the first memory, after determining the gradient.

A non-transitory computer-readable storage medium may store instructions that, when executed by a processor, configure the processor to perform the method.

In another general aspect, a memory management apparatus includes: a receiver configured to receive a parameter of a neural network and information of a device configured to perform an operation using the neural network; and a processor configured to store a result of an operation by at least one of layers included in the neural network in a first memory of the device, during a forward propagation operation performed for the neural network based on the parameter, store a gradient of a layer included in the neural network in a second memory of the device, during a backward propagation operation performed for the neural network based on the parameter and the result of the operation by the at least one layer, and manage the first memory and the second memory based on the information, the result of the operation by the at least one layer, and the gradient.

The first memory may include a local memory, and the second memory may include a global memory.

The information may include a number of cores of the device and a size of the first memory.

For the storing in the first memory, the processor may be configured to set a checkpoint in the at least one layer, and to store the result of the operation by the at least one layer in which the checkpoint is set in the first memory.

For the setting of the checkpoint, the processor may be configured to set the checkpoint in layers of the layers, wherein a number of the layers in which the checkpoint is set corresponds to a square root of the number of all layers included in the neural network.

For the storing in the second memory, the processor may be configured to determine the gradient of the layer included in the neural network based on the parameter and the result of the operation by the at least one layer, and to store the gradient in the second memory at the same time as the determining.

For the managing, the processor may be configured to determine a number of batches processable by a layer included in the neural network based on the parameter, the result of the operation by the at least one layer, and the size of the first memory, and to obtain a maximum number of batches for a parallel operation of the neural network based on the number of batches.

For the managing, the processor may be configured to generate a code for performing the parallel operation of the neural network based on the maximum number of batches.

For the generating of the code, the processor may be configured to generate the code based on an intermediate representation in which a checkpoint set in the at least one layer, the gradient, and the maximum number of batches are each reflected.

The processor may be configured to delete the result of the operation by the at least one layer from the first memory, after determining the gradient.

In another general aspect, a processor-implemented memory management method includes: storing, in a local memory of a device, an intermediate forward propagation result of a layer of a neural network, in response to the intermediate forward propagation result being generated; and storing, in a global memory of the device, a gradient of a weight of an intermediate backward propagation of the layer or another layer the neural network, in response to the gradient being generated, wherein the gradient is generated based on the intermediate forward propagation result, and the neural network is trained based on the stored gradient.

The intermediate backward propagation may be of the other layer the neural network and the gradient is determined based on an intermediate forward propagation result of the other layer, the intermediate forward propagation result of the other layer may be determined based on the intermediate forward propagation result of the layer, and a checkpoint may be set in the layer and not set in the other layer.

The method may include, in response to the gradient being generated, deleting the stored intermediate forward propagation result from the local memory and storing the stored gradient in the local memory.

Other features and aspects will be apparent from the following detailed description, the drawings, and the claims.

Figure 1:
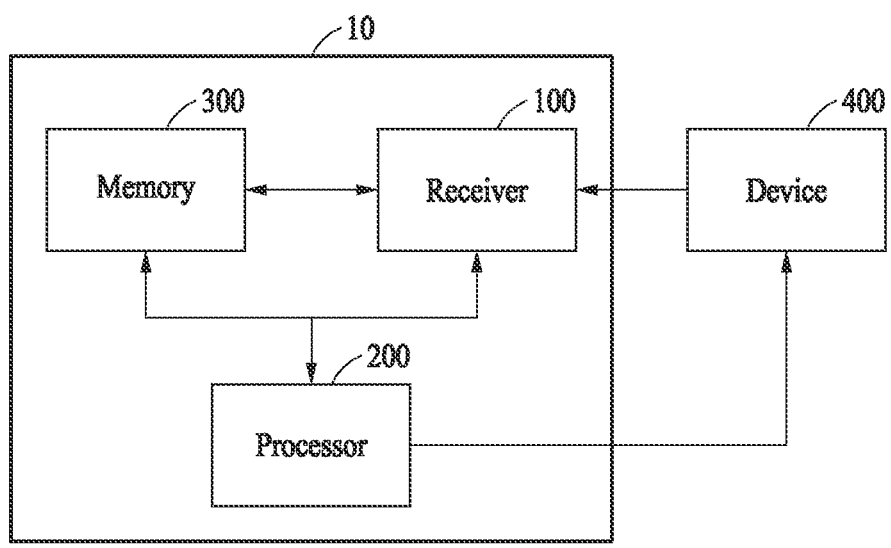
FIG. 1 illustrates an example of a memory management apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed structural or functional description is provided as an example only and various alterations and modifications may be made to the examples. Here, the examples are not construed as limited to the disclosure and should be understood to include all changes, equivalents, and replacements within the idea and the technical scope of the disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art, after an understanding of the disclosure of this application, may be omitted for increased clarity and conciseness.

Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only and is not to be limiting of the present disclosure. As used herein, the singular forms "a", "an", and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, integers, steps, operations, elements, components, numbers, and/or combinations thereof, but do not preclude the presence or addition of one or more other features, integers, steps, operations, elements, components, numbers, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains after and understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, examples will be described in detail with reference to the accompanying drawings. When describing the examples with reference to the accompanying drawings, like reference numerals refer to like components and a repeated description related thereto will be omitted.

Figure 2:
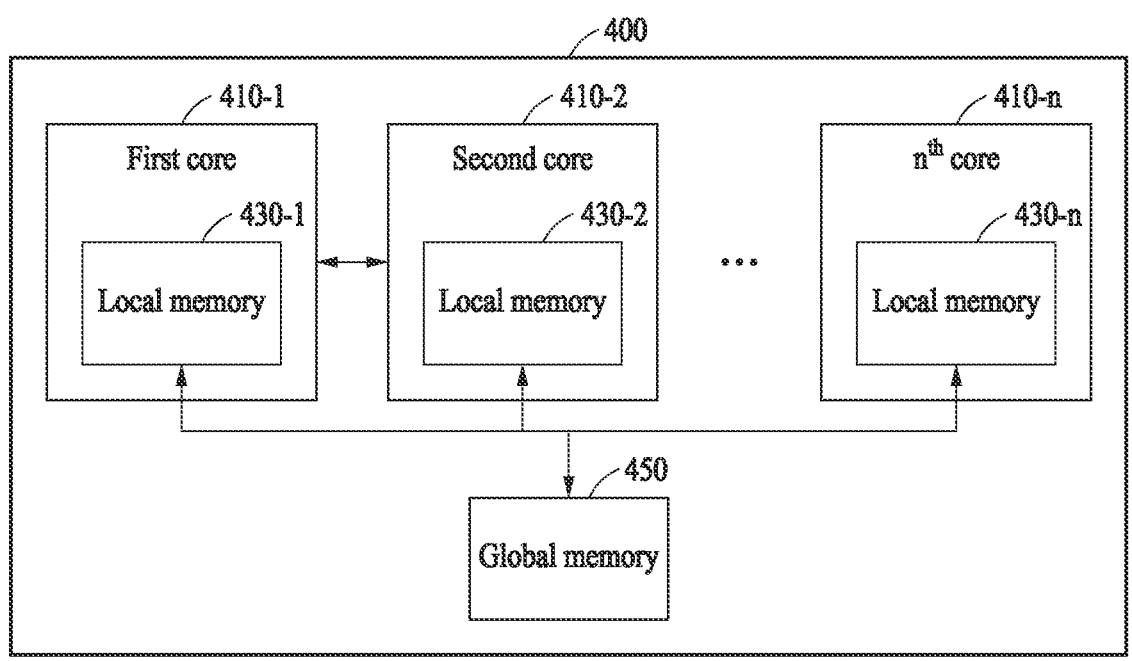
FIG. 2 illustrates an example of a device.

FIG. 1 illustrates an example of a memory management apparatus, and FIG. 2 illustrates an example of a device (for example, the device 400 shown in FIG. 1).

Referring to FIGS. 1 and 2, a memory management apparatus 10 may manage a device 400 and/or a memory included in the device 400. The memory management apparatus 10 may manage the device 400 and/or the memory included in the device 400 by using information on the device 400 received from the device 400.

The device 400 may perform an operation using a neural network. The neural network may include a statistical training algorithm based in machine learning and/or cognitive science. The neural network may refer to a model that has an ability to solve a problem, where nodes forming the network through synaptic combinations change a connection strength of synapses through training.

The nodes of the neural network may include a combination of weights and/or biases. The neural network may include one or more layers each including one or more nodes or nodes. The neural network may infer a desired result from a predetermined input by changing the weights of the nodes through learning.

The neural network may include a deep neural network (DNN). The neural network may include a convolutional neural network (CNN), a recurrent neural network (RNN), a perceptron, a multiplayer perceptron, a feed forward (FF), a radial basis network (RBF), a deep feed forward (DFF), a long short-term memory (LSTM), a gated recurrent unit (GRU), an auto encoder (AE), a variational auto encoder (VAE), a denoising auto encoder (DAE), a sparse auto encoder (SAE), a Markov chain (MC), a Hopfield network (HN), a Boltzmann machine (BM), a restricted Boltzmann machine (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), and/or an attention network (AN).

The device 400 may include cores 410-1, 410-2, . . . , 410-n. The cores 410-1, 410-2, . . . , 410-n are simply referred to as cores 410 for ease of description. The cores 410 may respectively include local memories 430-1, 430-2, . . . , 430-n.

In other words, the core 410-1 may include the local memory 430-1, the core 410-3 may include the local memory 430-3, and the core 410-n may include the local memory 430-n. The local memories 430-1, 430-2, . . . , 430-n are simply referred to as the local memories 430. The device 400 may include a global memory 450.

The memory management apparatus 10 may include a receiver 100 and a processor 200 (for example, one or more processors). The memory management apparatus 10 may further include a memory 300.

The receiver 100 may include a reception interface. The receiver 100 may receive a parameter related to the neural network and information on the device 400 that performs an operation using the neural network. The receiver 100 may output the parameter related to the neural network and the information on the device 400 to the processor 200.

The information on the device 400 may include the number of cores of the device 400 and the size of a first memory. The first memory may include or correspond to the local memories 430.

The processor 200 may process data stored in the memory 300. The processor 200 may execute a computer-readable code (for example, software) stored in the memory 300 and instructions triggered by the processor 200.

The "processor 200" may be a hardware data processing device including a circuit having a physical structure to perform desired operations. For example, the desired operations may include instructions or codes included in a program.

For example, the hardware data processing device may include a microprocessor, a central processing unit (CPU), a processor core, a multi-core processor, a multiprocessor, an application-specific integrated circuit (ASIC), and/or a field-programmable gate array (FPGA).

The processor 200 may perform a neural network operation. The processor 200 may perform the neural network operation in a hardware environment having a high-performance computing (HPC) and many-core structure.

The processor 200 may train the neural network. The processor 200 may train the neural network using the device 400. Training the neural network may include a forward propagation operation, a loss calculation, and/or a backward propagation operation. The processor 200 may calculate a loss by comparing a result of prediction by the neural network through the forward propagation operation to ground truth, and calculate a gradient of change for the result of prediction to be close to the ground truth through the backward propagation operation.

During a forward propagation operation performed for the neural network based on the parameter, the processor 200 may store a result of an operation by at least one of the layers included in the neural network in a first memory of the device 400.

The processor 200 may set a checkpoint in the at least one layer. The processor 200 may set the checkpoint in layers of the neural network, wherein the number of the layers corresponds to a square root of the number of all layers included in the neural network.

The processor 200 may store the result of the operation by the at least one layer, in which the checkpoint is set, in the first memory of the device 400.

During a backward propagation operation performed for the neural network based on the parameter and the result of the operation, the processor 200 may store a gradient of a layer included in the neural network in a second memory of the device 400. The second memory may include or correspond to the global memory 450.

The processor 200 may calculate the gradient of the layer included in the neural network based on the parameter and the result of the operation. The processor 200 may store the gradient in the second memory at the same time as (or immediately after) the calculation of the gradient, and/or may store the gradient in the second memory when the gradient is calculated.

The processor 200 may delete the result of the operation by the at least one layer from the local memories, after calculating the gradient.

The processor 200 may manage the first memory and the second memory based on the information, the result of the operation, and the gradient. The processor 200 may calculate the number of batches processable by a layer included in the neural network based on the parameter, the result of the operation, and the size of the first memory.

The processor 200 may obtain the maximum number of batches for a parallel operation of the neural network based on the number of batches. The processor 200 may generate a code for performing the parallel operation of the neural network based on the maximum number of batches.

The processor 200 may generate the code based on an intermediate representation (IR) in which a checkpoint set in the at least one layer, the gradient, and the maximum number of batches are each reflected.

The memory 300, the first memory, and the second memory may store the neural network model or the parameters of the neural network model. The memory 300, the first memory, and the second memory may store instructions (or a program) executable by the processor 200. For example, the instructions may include instructions to perform an operation of the processor and/or an operation of each element of the processor.

The memory 300, the first memory, and the second memory may be implemented by a volatile memory device or a nonvolatile memory device.

The volatile memory device may be or include a dynamic random access memory (DRAM), a static random access memory (SRAM), a thyristor RAM (T-RAM), a zero capacitor RAM (Z-RAM), and/or a Twin Transistor RAM (TTRAM).

The non-volatile memory device may be or include an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device), and/or an insulator resistance change memory.

Figure 3:
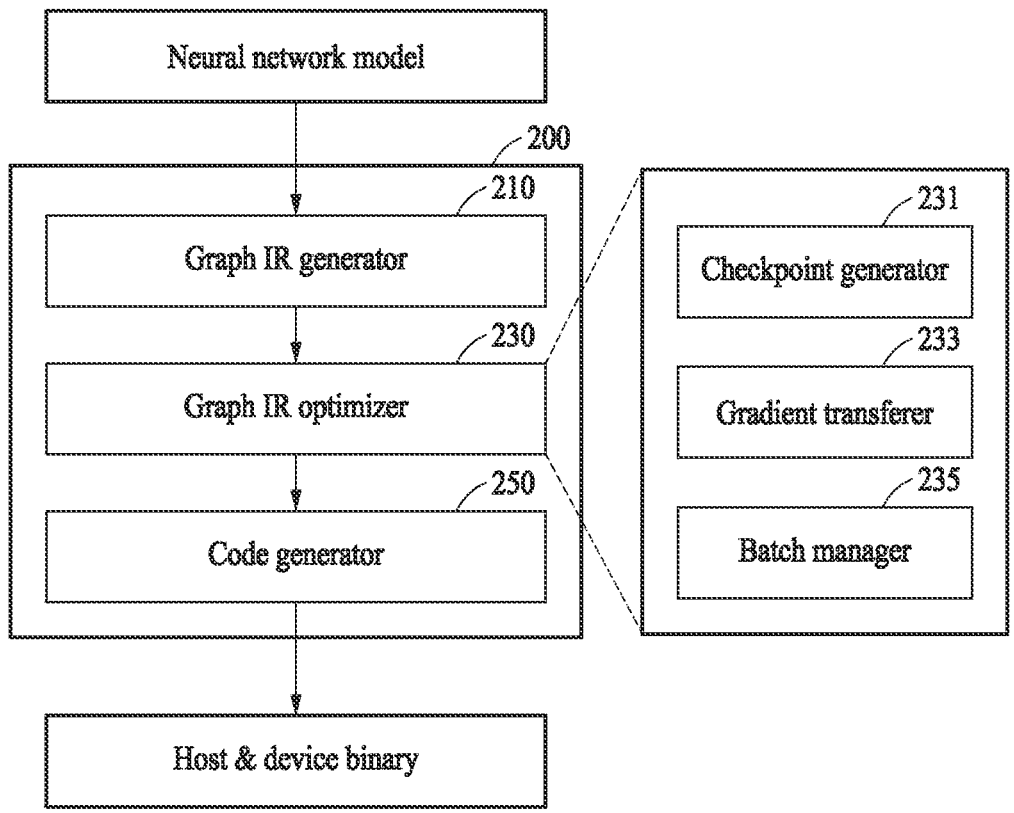
FIG. 3 illustrates an example of a processor.

FIG. 3 illustrates an example of a processor (for example, the processor 200 shown in FIG. 1).

Referring to FIG. 3, the processor 200 may include a graph IR generator 210, a graph IR optimizer 230, and a code generator 250. The graph IR optimizer 230 may include a checkpoint generator 231, a gradient transferer 233, and a batch manager 235.

The processor 200 may perform compilation based on the neural network so as to be performed in a multi-device or multi-core environment. Through the compilation, the processor 200 may convert the neural network into a program that is executable in multi-device or multi-core hardware.

The processor 200 may apply various optimizations by expressing the neural network model with a graph IR (or high-level IR) and then, convert the neural network model into a hardware-dependent code.

The graph IR generator 210 may generate the graph IR by converting the neural network. An IR may be a data structure or code that is used to express a source code within a compiler or a virtual machine.

The graph IR may be an abstract representation that represents a neural network model (for example, a deep learning model) with a computational graph. The graph IR may be a representation scheme of an operation before the neural network model is converted so as to operate only in a predetermined programming language or hardware.

The graph IR may represent various neural network framework models with a single representation and perform various optimizations in the form of a graph and thus, may be useful. In addition, when a graph representation that is not hardware-dependent is used, various optimization methods already found in different technical fields may be applied.

The graph IR optimizer 230 may optimize the neural network converted into the graph IR. The checkpoint generator 231 may set a checkpoint in at least one of the layers included in the neural network, during the forward propagation operation of the neural network.

The checkpoint generator 231 may indicate, in the graph IR, data remaining in the memory included in the device 400 among intermediate result values calculated by the layer included in the neural network.

The gradient transferer 233 may store a gradient included in the neural network in the second memory, during the backward propagation operation of the neural network. The gradient transferer 233 may calculate the gradient and explicitly insert an IR indicating that the calculated gradient is moved to the global memory 450 of a central device, e.g. device 400, into the graph IR.

The batch manager 235 may calculate the maximum number of batches that are executable by the device 400 using the local memories 430 based on the set checkpoint and the calculated gradient.

The graph IR optimizer 230 may perform additional optimization tasks such as constant folding and fusion on the neural network model.

The code generator 250 may generate a code (or source code) for controlling the device 400 that performs a neural network operation based on an IR of the optimized neural network model. The code generator 250 may generate a host and device binary. The code generator 250 may generate a device code executable by the device 400 including multiple devices or multiple cores and a central processing unit (CPU) code executable by a central device (for example, a CPU) that controls the device 400.

Figure 4:
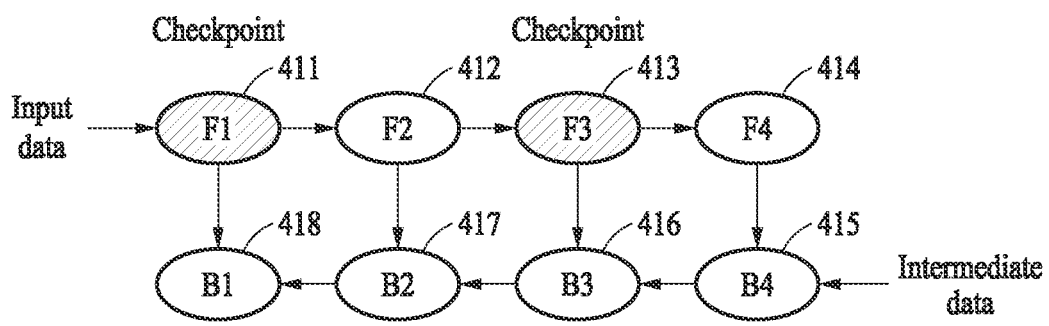
FIG. 4 illustrates an example of memory management.

FIG. 4 illustrates an example of memory management.

Referring to FIG. 4, the processor 200 may train a neural network (or a neural network model) through distributed learning using data parallelization. The processor 200 may save the memory (for example, the local memories 430) of the device 400 by using re-calculation.

Re-calculation may refer to a method of re-calculating and using intermediate values when necessary, rather than storing a portion of intermediate values calculated by layers included in a neural network. In this case, recalculation may refer to a method of saving memory by setting checkpoints in a portion of the layers included in the neural network and storing intermediate values only for the layers in which the checkpoints are set and not storing intermediate values for the remaining layers.

For example, results of operations by layers 413 and 415 may be used to perform an operation by a layer 416. The processor 200 may store the result of the operation by the layer 413 in the memory for operations of layers positioned in the latter half of the neural network even when the result of the operation by the layer 413 is not immediately used. The processor 200 may set a checkpoint in the layer 413 for a calculation by the layer 416 and store the output of the layer 413 in the local memories 430.

Likewise, since results of operations by layers 411 and 417 may be used perform an operation by a layer 418, the processor 200 may set a checkpoint in the layer 411 and store the result of the operation by the layer 411 in the local memories 430.

The processor 200 may use a result of an operation by a layer 412 when performing an operation by a layer 417. In this case, the processor 200 may perform the operation by the layer 417 after re-calculating the result of the operation by the layer 412 using the result of the operation by the layer 411 in which the checkpoint is set.

While the setting of the checkpoint increases an amount of computation to be performed by the device 400, the setting of the checkpoint increases the batch size of input data to be computed at one time, thereby increasing the utilization and throughput and improving the overall learning rate.

The processor 200 may delete the intermediate values used for the operations from the local memories 430. For example, when a checkpoint is set in the layer 413, the processor 200 may delete the result of the operation by the layer 413 from the local memories 430 after the result of the operation by the layer 413 is used (for example, after the result of the operation by the layer 413 is used to perform the operation by the layer 416).

The processor 200 may save the local memories 430 of the device 400 by setting checkpoints, and reduce an amount of memory occupied by gradients by immediately gathering an appropriate amount of gradients to the central device (for example, the global memory 450) for each computation by a layer, rather than gathering the gradients calculated by each device 400 to the central device at one time.

The processor 200 may determine the number of layers in which checkpoints are to be set, among the layers included in the neural network to be trained. For example, when n layers are included in the neural network, the processor 200 may set checkpoints in layers, wherein the number of layers corresponds to a square root of ($\sqrt{n}$). The processor 200 may determine the number of layers in which checkpoints are to be set, thereby calculating an amount of the local memories 430 to be occupied at a time when an operation by a predetermined layer is performed.

In the example of FIG. 4, a node may represent a layer of the neural network, and an edge may represent a flow of data. The layers 411 to 414 marked with F may represent nodes that perform a forward propagation operation, and the layers 415 to 418 marked with B may represent nodes that perform a backward propagation operation.

In this case, the layer 411 and the layer 418 may be the same layer. The layer 411 may indicate a layer when forward propagation is performed, and the layer 418 may indicate the same layer as the layer 411 when backward propagation is performed.

When checkpoints are set in the layers 411 and 413, the local memories 430 occupied immediately after the result of the operation by the layer 413 is calculated may be "Input Data Size+Weight Size of Entire Neural Network+Data Size of Checkpoint-Set Intermediate Result Values (F1 and F3)".

As gradients are not calculated in the forward propagation process, the gradients may not be reflected in the occupied memory. When a backward propagation has been performed up to the layer before the layer 417, the occupied local memories 430 may be "Input Data Size+Weight Size of Entire Neural Network+Size of F1 Intermediate Result Value+Size of Calculated Gradients (B3 and B4)".

In this case, when the backward propagation has been performed up to the layer before the layer 417, the intermediate result value of the layer 413 may be deleted as having been already used in the operation process by the layer 416, and the gradients calculated by the layers 415 and 416 may be added to the local memories 430.

The sum of the input data size (IFM), the weight size (W) of the entire neural network, the size (IM) of the intermediate result value of a layer in which a checkpoint is set, that is calculated and may be used again for a subsequent layer, and the already calculated gradient size (G) may be the size of data occupied at a predetermined point in time.

When the number of batches that may be processed by an $i^{th}$ layer is $B_i$, the size of data occupied at a predetermined point in time may be expressed by Equation 1 below, for example.

$$B_i \times (IFM+IM+G)+W \leq \text{Device memory size} \qquad \text{Equation 1:}$$

In Equation 1, Device memory size denotes the size of the local memories 430.

In the case of training a neural network using parallelization, a large portion of the local memories 430 may be occupied by gradients when all the calculated gradients are to be transferred to the global memory 450 at one time after the backward propagation operation is completed by the cores 410 included in the device 400. Thus, in the backward propagation process, the processor 200 may calculate a gradient by one layer and immediately store the calculated gradient in the global memory 450.

Through this, a portion of the local memories 430 occupied by gradients may be reduced, and the central device may prepare for an update of the neural network model by gathering the gradients in advance.

In other words, the size of data occupying the local memories when a gradient is stored in the second memory at the same time as calculating the gradient may be expressed by Equation 2 below, for example.

$$B_i \times (IFM+IM)+W \leq \text{Device memory size} \qquad \text{Equation 2:}$$

The processor 200 may calculate the number of batches $B_i$ that may be processed by a layer using Equation 2, for all the layers of the neural network.

The processor 200 may obtain the maximum number of batches for a parallel operation of the neural network based on the calculated numbers of batches $B_i$. In detail, the processor 200 may calculate the maximum number of batches for performing the neural network operation by applying data parallelization to the smallest value among the maximum numbers of batches $B_i$ of each layer calculated using Equation 2 for all the layers included in the neural network.

The processor 200 may obtain the maximum number of batches using Equation 3 below, for example.

$$\Sigma_{i=0}^{n} \min(B_i) \qquad \text{Equation 3:}$$

In Equation 3, n denotes the number of all layers included in the neural network.

Figure 5:
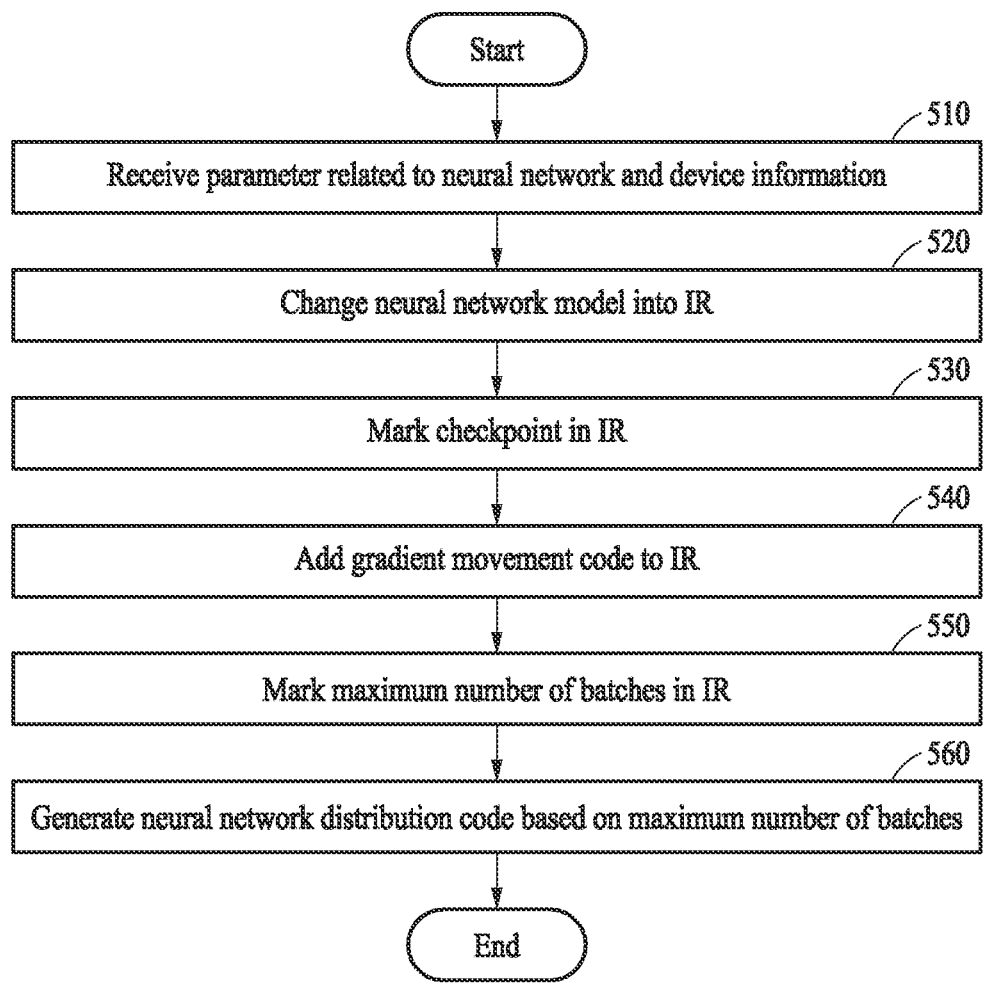
FIG. 5 illustrates an example of generating a code.

FIG. 5 illustrates an example of generating a code.

Referring to FIG. 5, a code for managing the memory of the device 400 may be generated. The device 400 may include the local memories 430 and the global memory 450.

In operation 510, the receiver 100 may receive a parameter related to a neural network and device information. The device information may include information on a hardware environment in which a neural network operation is to be performed. For example, the device information may include the number of cores and the size of local memory.

In operation 520, the processor 200 may change (or convert) a neural network model into an IR. In operation 530, the processor 200 may receive an IR that is used by a compiler for the neural network and set a checkpoint to indicate intermediate value data to be retained in the local memories 430 of the device 400 and utilized for re-calculation.

The processor 200 may transfer and store a gradient of a weight of the neural network to and in the global memory 450 of the central device while performing a backward propagation operation of the neural network based on the IR corresponding to the layer in which the checkpoint is set. In operation 540, the processor 200 may add a gradient movement code to the IR to store the gradient.

In operation 550, the processor 200 may calculate the maximum number of batches that are executable by the neural network on the local memories 430 of the device 400 based on the IR to which the gradient movement code is added, the intermediate value for which the checkpoint is set, and an IR to which a weight movement is applied, and add the calculated maximum number of batches to metadata of the IR.

In operation 560, the processor 200 may generate a distribution code by converting the IR to which the maximum number of batches is added into a code that is executable by the multiple cores and the central device.

Figure 6:
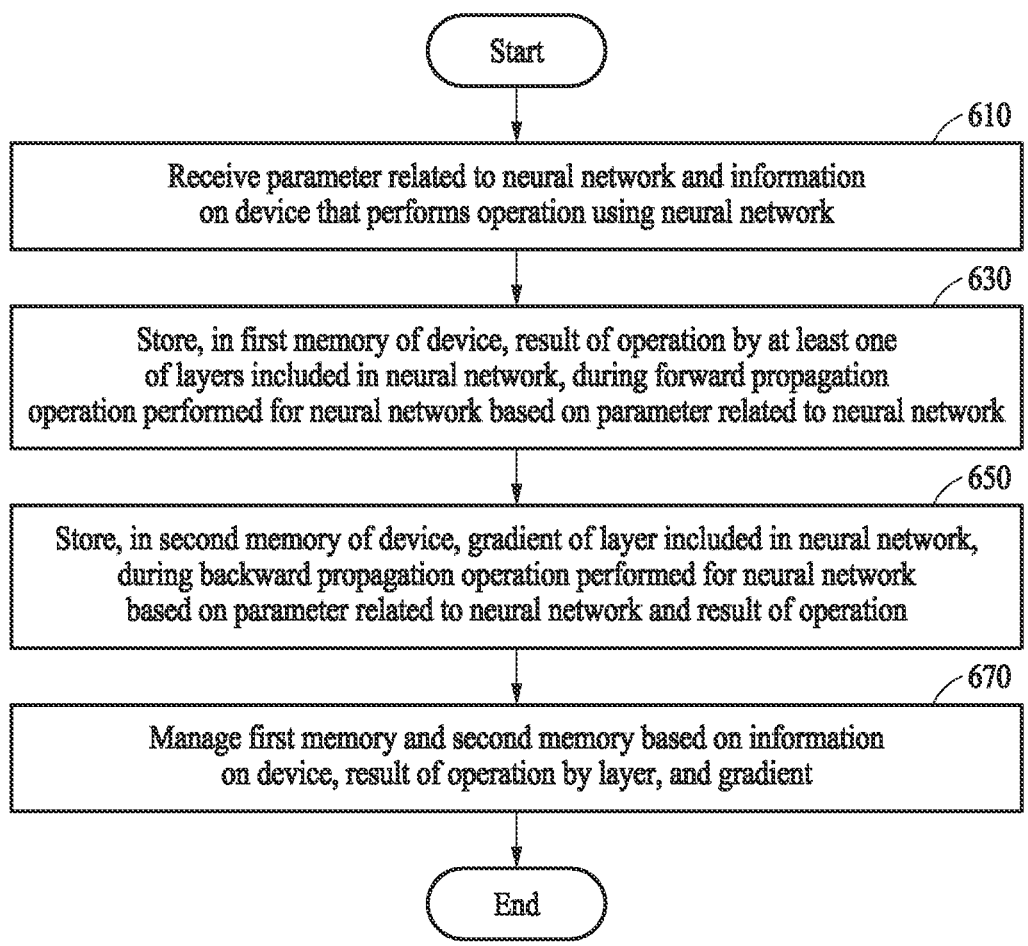
FIG. 6 illustrates an example of an operation of a memory management apparatus.

FIG. 6 illustrates an example of an operation of a memory management apparatus (for example, the memory management apparatus 10 of FIG. 1).

Referring to FIG. 6, in operation 610, the receiver 100 may receive a parameter related to a neural network and information on the device 400 that performs an operation using the neural network.

The information on the device 400 may include the number of cores of the device 400 and the size of a first memory.

In operation 630, during a forward propagation operation performed for the neural network based on the received parameter, the processor 200 may store a result of an operation by at least one of the layers included in the neural network in the first memory of the device 400.

The processor 200 may set a checkpoint in the at least one layer. The processor 200 may set the checkpoint in layers, wherein the number of layers corresponds to a square root of the number of all layers included in the neural network.

The processor 200 may store a result of an operation by the at least one layer in which the checkpoint is set in the first memory.

In operation 650, the processor 200 may store a gradient of a layer included in the neural network in a second memory of the device, during a backward propagation operation performed for the neural network based on the received parameter and the result of the operation.

The processor 200 may calculate the gradient of the layer included in the neural network based on the parameter and the result of the operation. The processor 200 may store the gradient in the second memory at the same time as the calculation of the gradient.

The processor 200 may delete the result of the operation by the at least one layer from the local memories, after calculating the gradient.

The first memory may include local memories, and the second memory may include a global memory.

In operation 670, the processor 200 may manage the first memory and the second memory based on the information on the device, the result of the operation, and the gradient. The processor 200 may calculate the number of batches processable by a layer included in the neural network based on the received parameter, the result of the operation, and the size of the first memory.

The processor 200 may obtain the maximum number of batches for a parallel operation of the neural network based on the number of batches. The processor 200 may generate a code for performing the parallel operation of the neural network based on the maximum number of batches.

The processor 200 may generate the code based on an IR in which a checkpoint set in the at least one layer, the gradient, and the maximum number of batches are each reflected.

The memory management apparatuses, receivers, processors, memories, devices, cores, local memories, global memories, graph IR generators, graph IR optimizers, code generators, checkpoint generators, gradient transferers, batch managers, memory management apparatus 10, receiver 100, processor 200, memory 300, device 400, cores 410-1, 410-2, . . . , 410-n, local memories 430-1, 430-2, . . . , 430-n, global memory 450, graph IR generator 210, graph IR optimizer 230, code generator 250, checkpoint generator 231, gradient transferer 233, batch manager 235, and other apparatuses, devices, units, modules, and components described herein with respect to FIGS. 1-6 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented memory management method, comprising:
    controlling a global memory and one or more local memories associated with a device that is configured to perform training operations of a neural network for a training of the neural network, including controlling:
        a storing, by the one or more local memories, of a calculated result of a first layer of the neural network in the one or more local memories during a forward propagation operation of the training with respect to training data propagated through an early layer to a later layer of the neural network;
        a storing of a calculated gradient of the first layer to the global memory during a backward propagation operation of the training with respect to the training data, where the gradient is calculated based on the stored calculated result;
        a deleting of the calculated result of the first layer in the one or more local memories dependent on a progression of the backward propagation operation and before the backward propagation operation has completed with respect to the early layer; and
        a storing, by the one or more local memories and dependent on the deleting of the calculated result of the first layer, of a result of one of the performed training operations in the one or more local memories where the calculated result of the first layer was stored to by the storing of the calculated result,
    wherein the storing of the calculated gradient of the first layer includes storing the calculated gradient in the global memory before the backward propagation operation has completed with respect to the early layer.

2. The method of claim 1, wherein the one or more local memories are respective distributed memories of a plurality of processor cores of the device that perform the calculation of the result of the first layer, and wherein at least one of the plurality of processor cores or another processor core of the device calculate the gradient.

3. The method of claim 2, wherein the controlling of at least the one or more local memories is based on information of the device, where the information comprises a total number of the plurality of processor cores and a size of the one or more local memories.

4. A processor-implemented memory management method, comprising:

receiving a parameter of a neural network and information of a device configured to perform an operation using the neural network;

controlling a storing of a result of an operation by at least one of layers included in the neural network in a first memory of the device, during a forward propagation operation performed for the neural network based on the parameter;

controlling a storing of a gradient of a layer included in the neural network in a second memory of the device, during a backward propagation operation performed for the neural network based on the parameter and the result of the operation by the at least one layer;

controlling the first memory and the second memory based on the information, the result of the operation by the at least one layer, and the gradient; and executing code, which sets a checkpoint in multiple layers of the neural network in the code, to control parallel operations of a plurality of processor cores of the device, the code including instructions to control the storing of the result of the operation by the at least one of the layers included in the multiple layers, the storing of the gradient, and the controlling of the first memory and the second memory, where a number of the multiple layers is less than a number of all layers of the neural network, wherein the storing in the first memory comprises storing the result of the operation by the at least one layer in which the checkpoint is set in the first memory, wherein the first memory is one of plural distributed memories of the plurality of processor cores.

5. The method of claim 4, wherein the number of the multiple layers corresponds to a square root of the number of the all layers included in the neural network.

6. The method of claim 1, further comprising:
determining a number of batches processable by the first layer based on parameter of the first layer, the calculated result of the first layer, and a size of the one or more local memories; and
obtaining a maximum number of batches for a parallel operation of the neural network based on the number of batches.

7. The method of claim 6,
wherein the one or more local memories are respective distributed memories of a plurality of processor cores of the device, and
wherein the method further comprises generating code for performing the parallel operation of the one or more processor cores with respect to the neural network based on the maximum number of batches.

8. The method of claim 7, wherein the generating of the code comprises:
generating the code based on an intermediate representation in which a checkpoint set in the code with respect to the first layer for the storage of the calculated result of the first layer in the one or more local memories, and instructions with respect to the storage of the calculated gradient to the global memory and the maximum number of batches are reflected, and
representing respective forward propagation result recalculation instructions in the code, instead of respective checkpoints, with respect to one or more other layers of the neural network for respective storings of calculated gradients of the one or more other layers to the global memory during the backward propagation operation.

9. The method of claim 1, wherein the deleting of the calculated result of the first layer comprises deleting the calculated result of the first layer from the one or more local memories upon the gradient having been calculated.

10. A non-transitory computer-readable storage medium storing instructions that, when executed by one or more processors, configure the one or more processors to result in the device performing the method of claim 1.

11. An apparatus, comprising:
one or more processors configured to control a global memory and one or more local memories associated with a device that is configured to perform training operations of a neural network for a training of the neural network, including a control of:
a storage, by the one or more local memories, of a calculated result of a first layer of the neural network in the one or more local memories during a forward propagation operation of the training with respect to training data propagated through an early layer to a later layer of the neural network,
a storage of a calculated gradient of the first layer to the global memory during a backward propagation operation of the training with respect to the training data, where the gradient is calculated based on the stored calculated result;
a deletion of the calculated result of the first layer in the one or more local memories dependent on a progression of the backward propagation operation and before the backward propagation operation has completed with respect to the early layer; and
a storage, by the one or more local memories and dependent on the deletion of the calculated result of the first layer, of a result of one of the performed training operations in the one or more local memories where the calculated result of the first layer was stored to by the storage of the calculated result,
wherein the storage of the calculated gradient of the first layer includes a storage of the calculated gradient in the global memory before the backward propagation operation has completed with respect to the early layer.

12. The apparatus of claim 11, wherein the one or more local memories are respective distributed memories of a plurality of processor cores of the device that perform the calculation of the result of the first layer, and wherein at least one of the plurality of processor cores or another processor core of the device calculate the gradient.

13. The apparatus of claim 12, wherein the control of at least the one or more local memories is based on information of the device, where the information comprises a total number of the plurality of processor cores and a size of the one or more local memories.

14. The apparatus of claim 11,
wherein, for the storage of the calculated result of the first layer in the one or more local memories, the one or more processors are configured to execute code with respective set checkpoints with respect to multiple layers, including the first layer and one or more other layers, among all layers of the neural network, and
wherein the code configures the one or more processors to checkpoint respective results of operations during the forward propagation operation in the one or more local memories of the multiple layers, where a number of the multiple layers is less than a number of the all layers.

15. The apparatus of claim 14, wherein the number of the multiple layers is a square root of the number of the all layers of the neural network.

16. The apparatus of claim 11, wherein the one or more processors or one or more other processors of the apparatus are configured to:

determine a number of batches processable by the first layer based on parameters of the first layer, the calculated result of the first layer, and a size of the one or more local memories; and obtain a maximum number of batches for a parallel operation of the neural network based on the number of batches.

17. The apparatus of claim 16, wherein the one or more local memories are respective distributed memories of a plurality of processor cores, included in the one or more processors, that perform the calculation of the result of the first layer, and wherein at least one of the plurality of processor cores or another processor core included in the one or more processors calculate the gradient, and wherein the one or more other processors are configured to perform the determination of the number of batches and the obtainment of the maximum number of batches, and further configured to generate code for performing the parallel operation of the one or more processors with respect to the control of the global memory and the one or more local memories based on the maximum number of batches.

18. The apparatus of claim 17, wherein, for the generating of the code, the one or more other processors are configured to:

generate the code based on an intermediate representation in which a checkpoint is set in the code with respect to the first layer for the storage of the calculated result of the first layer in the one or more local memories, and instructions with respect to the storage of the calculated gradient to the global memory and the maximum number of batches are reflected; and represent respective forward propagation result recalculation instructions in the code, instead of respective checkpoints, with respect to one or more other layers of the neural network for respective storings of calculated gradients of the one or more other layers to the global memory during the backward propagation operation.

19. The apparatus of claim 11, wherein the deletion of the calculated result of the first layer is performed upon the gradient having been calculated.

20. A processor-implemented memory management method, comprising:

executing code, for controlling parallel operations of a plurality of processor cores, causing:

a checkpointing, in a local memory of a device, of a result of a first layer of a neural network calculated in a forward propagation operation of the neural network; and an updating of training gradients of the neural network in a global memory of the device by controlling:

a storing, in the global memory, of a first gradient of a weight of the first layer calculated in a backward propagation operation of the neural network based on the checkpointed result of the first layer, in response to the first gradient being calculated; and a storing, in the global memory, of a second gradient of a weight of the second layer of the neural network calculated in the backward propagation operation based on a recalculated forward propagation result of the second layer of the neural network generated during the backward propagation operation of the neural network, in response to the second gradient being calculated, wherein the one or more local memories are respective distributed memories of the plurality of processor cores of the device, and wherein the code is an intermediate representation of the neural network, and includes instructions to control the updating of the training gradients and instructions to control the checkpointing, the instructions to control the checkpointing including a checkpoint with respect to the first layer instructing the checkpointing, and not including a checkpoint with respect to the second layer.

21. The method of claim 20, further comprising, upon the first gradient being generated, respectively deleting the checkpointed result of the first layer and performing the storing of the first gradient to the global memory.

22. The method of claim 2, wherein the storing of the calculated result in the one or more local memories represents a checkpointing of the calculated result based on a set checkpoint included in code for the first layer, where the code controls a parallel operation of the plurality of processor cores, and wherein the code comprises respective checkpoints for settings of respective checkpoints for multiple layers among all layers of the neural network, wherein a number of the multiple layers is less than a number of the all layers of the neural network.

23. The method of claim 22, wherein the number of the multiple layers is a square root of the number of the all layers of the neural network.

24. The method of claim 1, wherein the storing of the calculated gradient of the first layer includes storing the calculated gradient in the global memory upon the gradient of the first layer being calculated.

25. The method of claim 1, wherein the controlling of the one or more local memories comprise storing calculated first results of one or more first layers of the neural network in the local memories of the device, during the forward propagation operation, as checkpointings of the calculated first results of the one or more first layers for use in gradient calculations during the backward propagation operation, where the storing of the calculated result of the first layer in the one or more local memories represents one of the checkpointings, and the one or more first layers of the neural network do not include all of the layers of the neural network such that second results of one or more second layers of the neural network calculated during the forward propagation operation are not checkpointed; and wherein the controlling of the global memory comprises storing respective other gradients to the global memory during the backward propagation operation, where the other gradients are calculated based on respective recalculations during the backward propagation operation of the second results of the one or more second layers of the neural network.

26. The method of claim 25, wherein the local memories are respective distributed memories of a plurality of processor cores of the device, and wherein the method further comprises the plurality of processor cores calculating the first results, the gradient of the first layer, the second results, the recalculated second results, and the other gradients.

27. The apparatus of claim 11, wherein the deletion of the calculated result of the first layer comprises a deletion of the calculated result of the first layer from the one or more local memories upon the gradient having been calculated.

28. The apparatus of claim 12, wherein the apparatus is the device and the one or more processors include at least the plurality of processor cores.

29. The apparatus of claim 11, wherein the storage of the calculated gradient of the first layer includes storage of the calculated gradient in the global memory upon the gradient of the first layer being calculated.

30. The method of claim 1, wherein, in the deleting of the calculated result of the first layer, the calculated result is deleted by the storing of the result of one of the performed training operations.

31. The method of claim 1,
wherein the backward propagation operation is a progression, from a layer subsequent to a second layer to the second layer that collectively correspond to plural layers of the neural network, of respective operations of the plural layers, and
wherein the deleting is performed before the backward propagation operation has completed a corresponding operation, among the respective operations of the plural layers of the second progression, with respect to the early layer.

32. The method of claim 4, wherein the number of the multiple layers is based on the number of the all layers included in the neural network.

* * * * *